W. J. WOHLENBERG.
ELASTIC FLUID METER.
APPLICATION FILED JULY 19, 1915.
1,303,443.
Patented May 13, 1919.
2 SHEETS—SHEET 1.
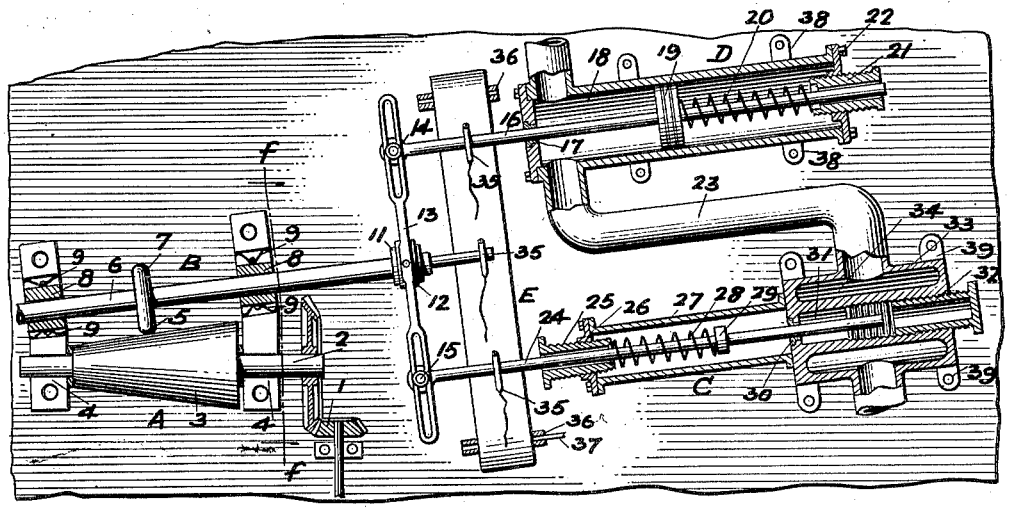
Fig. 2.   Fig. 1.
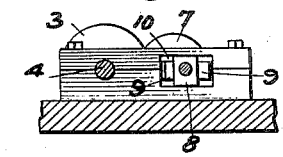
Fig. 3.
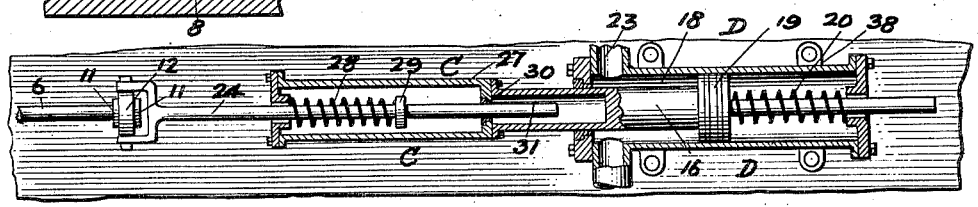
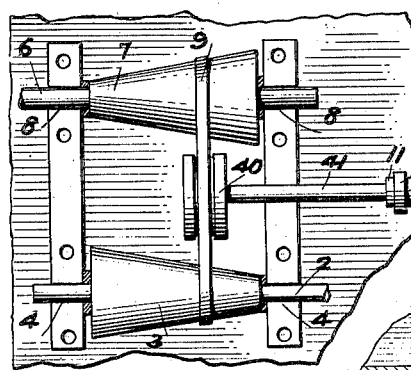
Fig. 5.
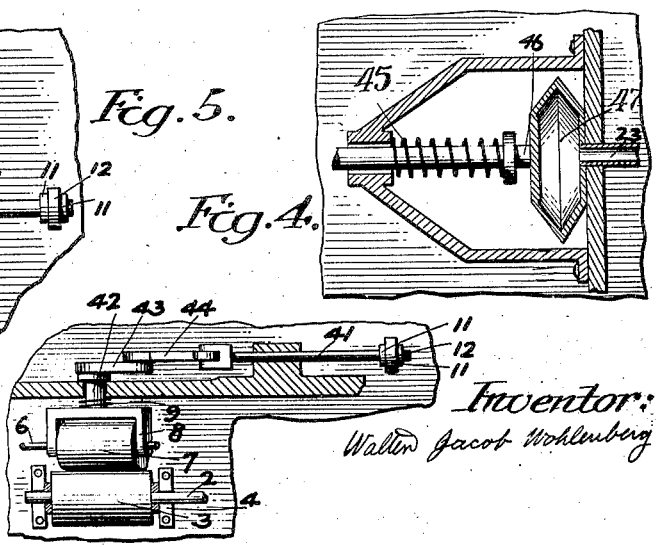
Fig. 4.
Fig. 6.
Inventor:
Walter Jacob Wohlenberg

W. J. WOHLENBERG.
ELASTIC FLUID METER.
APPLICATION FILED JULY 19, 1915.

1,303,443.

Patented May 13, 1919.
2 SHEETS—SHEET 2.

Inventor:
Walter Jacob Wohlenberg

UNITED STATES PATENT OFFICE.

WALTER JACOB WOHLENBERG, OF LINCOLN, NEBRASKA.

ELASTIC-FLUID METER.

1,303,443.  Specification of Letters Patent.  Patented May 13, 1919.

Application filed July 19, 1915. Serial No. 40,750.

*To all whom it may concern:*

Be it known that I, WALTER JACOB WOHLENBERG, a citizen of the United States, and a resident of Lincoln, in the county of Lancaster and State of Nebraska, have invented a new and Improved Elastic-Fluid Meter, of which the following is a full, clear, and exact description.

My invention relates to meters by means of which it is desired to measure the quantity of an elastic fluid conveyed through any conduit.

One object of my invention is to have a means within such meters for automatically adjusting the registering mechanism to variations of the pressure of the fluid being metered.

A second object of my invention is to have a means within such meters for automatically adjusting the registering mechanism to variations of the temperature of the fluid being metered.

A third object of my invention is to have a means within such meters for automatically and simultaneously adjusting the registering mechanism to variations of both the pressure and temperature of the fluid being metered.

A fourth object of my invention is to have a means within such meters for automatically and simultaneously adjusting the registering mechanism to variations of the pressure and temperature of the fluid being metered in such a manner that the amount registered will be proportional to the weight of the quantity of fluid metered.

A fifth object of my invention is to have a means whereby continuous graphic records of the pressure, temperature, and density, or any of these separately, of the fluid being metered may be obtained.

I accomplish these and other objects of my invention by the structures conventionally disclosed in the accompanying drawings, in which similar characters of reference denote corresponding parts in all views shown.

Figure 1 is a partly sectional view of the mechanism disclosing all the essential features of the invention, the parts being shown in such relative positions as to make explanation by reference to said figure easy.

Fig. 2 is a sectional view of the part of Fig. 1 looking from line $ff$ in the direction of the arrows.

Fig. 3 is a view showing a different mechanical arrangement of the parts C and D shown in Fig. 1.

Fig. 4 discloses a modified construction of the cylinders, being a part of mechanisms C and D.

Figs. 5 and 6 show modified mechanical arrangements of the mechanisms A and B combined.

Figure 7:
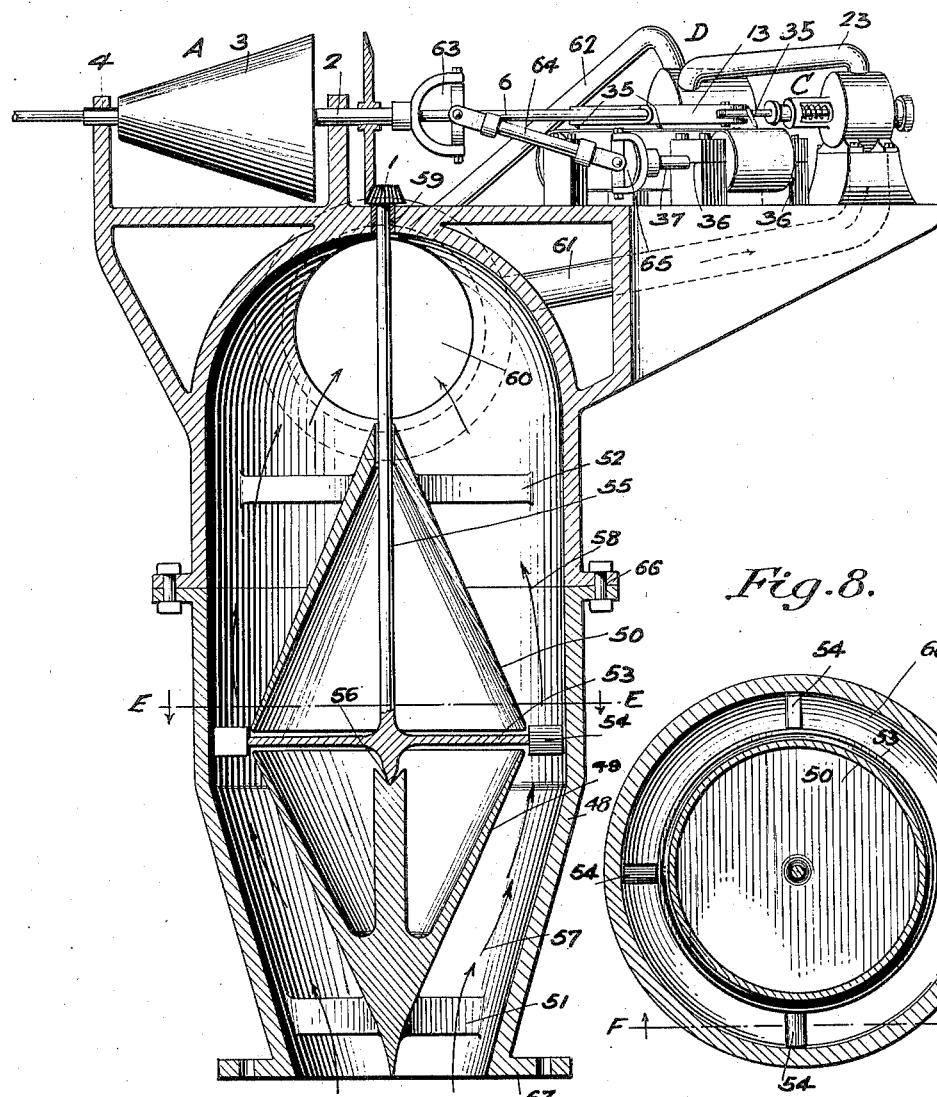

Fig. 7 illustrates an arrangement of a volume-measuring device in relation to the mechanisms A, B, C and D.

Figure 8:
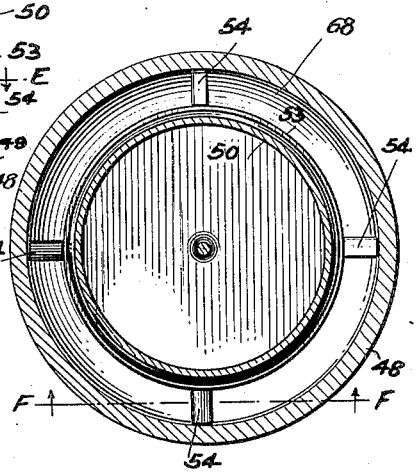
Figure 9:
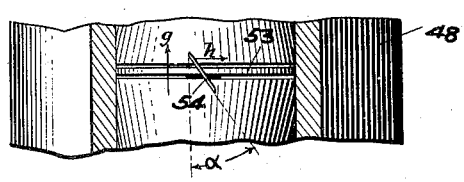

Fig. 8 is a sectional view of Fig. 7 looking from line E—E in direction of arrows; and Fig. 9 is a sectional view looking from line F—F of Fig. 8 in direction of arrows.

It is a well known fact that the density of a gas varies directly as the pressure and inversely as the temperature. The calorific energy of a unit volume of gas and the intrinsic energy of vapors is proportional to the weight of the gas within that volume. Since most of the gas being used today is used for the intrinsic energy and vapors for the intrinsic energy they contain, and since therefore the value of the quantities used depends respectively upon the calorific and intrinsic energies and upon the weights of the fluids used rather than on their volume, it is important that we have elastic fluid meters which give an accurate registration of the weights of fluids passed or the equivalent volumes reduced to some standard conditions. Since, however, either the velocity or volume measurements are the only practical measurements we can directly take in a meter, and because the weight per unit volume measured varies directly as the pressure and inversely as the temperature, it is necessary that a mechanism be adopted which corresponds with these variations so as to automatically correct each unit volume measured for its density, which, as above stated, varies directly as the pressure and inversely as the temperature. Obviously we must have a mechanism which increases the rate of registering per unit volume passed for an increase in pressure, and decreases the rate of registering per unit volume passed for an increase of temperature.

Referring to Fig. 1: A is a rotating element fixed axially between bearings 4 and made up of shaft 2 and cone 3 rigidly fixed together. To shaft 2 a rotary motion is transmitted through some means as gearing 1 from the ordinary displacement mechanism or velocity mechanism of any volume gas meter and one arrangement of which is shown in Fig. 7. This volume-measuring mechanism as shown consists of an outer casing 48 with an inlet at flange 67 and a discharge at 60. The fluid path is as shown by arrows 57 and 58. The fluid being metered enters at the inlet, is diverted by means of cone 49 so as to generate into an annular stream in chamber 68 (lettered in Fig. 8), and from there, as shown by arrow 58, it flows to the discharge at 60. The cones 49 and 50 are held in place by means of ribs 51 and 52 extending from the outer casing 48, and the purpose of these cones is to provide such a channel that at a section the annular area 68 is reduced in size, thereby causing the fluid velocity to be increased at this reduced section. This increased velocity is for the purpose of giving appreciable velocity of rotation to a wheel 53 whose axle 55 may pass through the outer casing as shown at 59. This axle may have a pivot bearing as shown at 56 and a bearing at 59, where likewise suitable packing must be provided to prevent leakage of the fluid to the outside. The wheel 53 is provided at its periphery with vanes 54 extending radially into the annular space 68. These vanes are set at an angle to the direction of fluid flow as indicated by arrow $g$, Fig. 9, so that any velocity of the fluid through the section 68 will tend to cause the vanes 54 to move in the direction indicated by the arrow $h$ of Fig. 9. With zero frictional losses and zero inertia then at all times the velocity of the vane in the direction $h$ will be $$V \tan \alpha$$

where $\alpha$ represents the angularity of the vane as shown and $V$ the fluid velocity in direction $g$.

This peripheral velocity of the vane will thus under ideal conditions be proportional to the fluid velocity through the section, and may thus be utilized to register volumes of fluid flowing through the section. Since, however, all actual mechanisms involve friction and inertia, the actual volume of flow will be greater than that obtained by multiplying the proportional factor of the ideal meter by the speed of the vanes 54. The dials may, however, be properly graduated during calibration to correct within a very small error for this deviation. The revolution of wheel 53 is thus transmitted by means of gearing 1 to the rotor 3 of mechanism A; and, referring now also to Fig. 1, it is thus seen how the rate of revolution of cone 3 is therefore a measure of the rate of volume flow of the fluid being metered.

B is a rotating element containing wheel 7 mounted rigidly on shaft 6 which rests in bearings 8. The wheel 7 has its periphery 5 held in contact with the face of the cone 3 by means as springs 9 pressing, with a resultant force, in the direction of the cone face, on bearing blocks 8, which are free except for these springs to slide laterally in slots 10 as shown in Fig. 2. The axial position of the wheel 7 with respect to cone 3 is determined by the resultant of forces acting on lever 13. Consequently the rate of revolution of wheel 7 with respect to cone 3 is determined by means of this resultant force acting on lever 13. This lever is attached by means of pins to collar 12 through which shaft 6 passes. On either side of collar 12 are collars 11 rigidly attached to shaft 6. This shaft now may rotate freely within collar 12, but if any forces acting on lever 13 combine to have an axial resultant at its attachment to collar 12 in the direction of shaft 6, this shaft will be displaced axially to such a new position in which equilibrium again exists.

The position of lever 13 is controlled by means of mechanisms C and D. Mechanism C adjusts for the temperature variations, and mechanism D for the pressure variations of the gas being metered.

Mechanism C has a cylinder chamber 31 into which projects a piston rod 24 through packing 30. The piston rod 24 has its other end attached to the lever 13 at 15 and is forced into the cylinder chamber 31 by means of spring 28 pressing against collar 29 which is fixed to the rod. Chamber 31 is filled with some fluid whose volume varies considerably with its temperature, such as mercury, but whose volume is preferably not appreciably affected by the pressure. Hence an increase in temperature of the fluid within chamber 31 would force piston rod 24 out, thus tending to move wheel 7 by means of lever 13 to a smaller diameter on cone 3 and hence the rate of revolution of 7 with respect to 3 would be decreased. This arrangement of the mechanism thus affords the means of having the ratio between the rate of registering and rate of volume flow varied in the same sense with the temperature as the density of the fluid varies with its temperature. It is, however, not only necessary that this ratio be varied in the same sense as the density, but also that it be varied in this sense by the proper amount. That is, a means must be provided whereby, for a given temperature, the ratio between the rate of registering and rate of volume flow may be adjusted or altered. This is the prime purpose of the cap 32 of the temperature cylinder, for by means of it the volume of the temperature cylinder (and hence the amount of temperature liquid contained) may be varied, and this affects the ratio between the rate of registering and rate of volume flow as explained in the following paragraph.

The amount of displacement of the rod 24 and hence wheel 7 per unit change of fluid temperature evidently depends upon the change of volume per unit temperature change of the temperature liquid contained in the temperature cylinder, and, for incompressible liquids, completely filling the temperature cylinder, this change of volume depends obviously wholly on the amount of liquid contained. The amount of this temperature liquid may be altered during adjustment of the meter by unscrewing cap 32, adding or subtracting some of the liquid or fluid, and then replacing the cap and screwing it in until the inclosed volume has all the air expelled and is completely filled with the temperature fluid and piston rod 24.

So that the tension of the spring 28 may be adjusted to be great enough to force the rod 24 into the cylinder chamber 31 when the volume of temperature liquid contracts due to cooling, the cap 25 is provided.

Mechanism D has a cylinder chamber 18 into which projects a piston 19 rigidly attached to rod 16. One end of this rod is attached to lever 13 at 14. The piston 19 is forced into the cylinder chamber by means of spring 20, one end of which butts up against the piston and the other against the adjustable cap 21. Some or all of the gas to be used passes through the conduit 23 and is taken from such a place in the line that the gas pressure in the chamber 18 is equal to that of the gas passing through the volume mechanism which rotates element A. If the gas pressure increases, piston 19 is forced toward cap 21, compressing spring 20 until equilibrium results. This moves lever 13 in such a way as to tend to move wheel 7 to a larger diameter on cone 3, and hence the rate of revolution of 7 with respect to 3 is increased. Thus a means is provided for having the ratio between the rate of registering and the rate of volume flow varied in the same sense with the pressure of the fluid being metered as its density varies with the pressure. It is, however, necessary that it vary not only in the same sense but likewise by the proper amount or, as for the temperature mechanism, a separate means of correction must be provided whereby the ratio of rate of registering volume flow may be corrected or altered for any given pressure of the fluid being metered. This is the purpose of the means provided by cap 21 and is accomplished as follows. If the spring is not of the proper strength to give a compression corresponding to the density variation of the fluid with pressure, then by unscrewing this cap the spring may be taken out and one of the proper dimensions put in its place. To adjust the zero point, it is merely necessary to screw in or out the cap 21.

It should now be understood that in normal operation the adjustment caps 21, 25 and 32 are not touched, but merely provide a means with springs 20 and 28 and the temperature fluid of bringing the meter into proper adjustment.

Obviously mechanisms C and D need not necessarily have the piston rods extending into the chambers wherein the change of volume takes place, but might as shown in Fig. 4 have the piston rods 46, butt up against a diaphragm 47, which might have an inlet for gas pressure or be filled with the temperature fluid to take the place of cylinder 31 when inlet 23 would be closed. Just as in the foregoing cylinders a change in temperature or pressure actuates a piston rod 46 against the tension of a spring 45, the displacement from the piston rod being transmitted to mechanism B.

In short, the rate of weight of gas flowing at any and all instants is equal to the product of the volume rate and the instantaneous density. Obviously the volume rate is proportional to the rate of revolution of cone 3. The circumferential speed along this cone is, however, a variable, and at all times there is a circumference on the cone at which the speed is proportional to the rate of weight flow of the gas. It is the function of mechanisms C and D to keep the wheel 7 in such an axial position that the peripheral velocity transmitted to it from the cone 3 is proportional to the rate of weight flow of the gas. Of course the mechanism might be adjusted to register proportionally to some other quantity than weight, and certainly would not be a new invention just on that account. Obviously the direct registering mechanism is taken from shaft 6 extended.

If it is desired to have graphic continuous records of the temperature, pressure and density of the gas being metered, it is merely necessary to have a record tape stretched between rollers resting in bearings 36 as shown. Motion may be transmitted to one of the rollers through its shaft 37 extended, as shown, for instance, in Fig. 7, where the motion from gearing 1 is transmitted by means of universal joints 63 and 65 and shafting 64 to said shaft 37. In this figure the metered fluid is shown as conducted to temperature and pressure cylinders and then back to fluid main in conduits 61, 23 and 62. Thus as shown in these figures the tape will be drawn along in a direction at right angles to the displacements caused in the rods 6, 24 and 16 of mechanisms B, C and D, due to changes of the density, temperature and pressure of the fluid being metered. Pens 35 are attached to these rods, where they pass over the tape, in such a manner as to bear on the tape. The longitudinal motion of the tape will now cause lines to be traced on it whose lateral positions will be determined by the temperature, pressure and density of the fluid being metered, and variations of these coördinates will be recorded on the tape as marks of varying lateral positions on said tape. In the mechanism as shown the longitudinal lengths of the recorded lines will be proportional to the metered volumes of fluid.

Fig. 3 represents a rearrangement of the mechanism C and D in which the lever 13 is obviated and which arrangement is strictly applicable to gases obeying Boyle's and Charles' laws. The cylinder 31 of mechanism C now serves also as the piston rod 16 for mechanism D, so that the motion from piston 19 is transmitted to rod 24 through said cylinder. In this case cylinder 18 also functions as the annular temperature chamber 34 surrounding cylinder 31. In both Figs. 1 and 3 the displacements in the mechanism caused by pressure and temperature changes are transmitted to a common member in such a manner that the parts of the mechanism operated by pressure and temperature changes are actuated independently. In the arrangement disclosed in Fig. 3 this common member is the piston rod 24 of the temperature cylinder.

Figs. 5 and 6 represent modifications of the mechanisms A and B combined. In all figures there is a primary rotating element 3 receiving its rotation from the volume or velocity-measuring apparatus of the meter, and a secondary rotating element 7 receiving its rotary motion on its surface of revolution from the surface of revolution of the primary element. There is also a means incorporated of varying the velocity ratio between the primary and secondary elements. In the structure disclosed in Fig. 5 this means consists of a guide 40 which, when it is moved through collar 12 by mechanisms C and D, will cause the elastic tape 9 to travel axially across rotors 3 and 7; and since the ratio of their diameters varies in the axial direction, their velocity ratio is thereby changed. In the structure disclosed in Fig. 6 this means consists of the combination of the secondary roller 7 mounted on shaft 42 to be rotatable about an axis at right angles to the axis of shaft 2. The crank 43 is fixed to shaft 42 and the angular position of crank 43 and hence rotor 7 with respect to rotor 3 is determined by mechanisms C and D operating on collar 12 and thus on rod 41, and connecting link 44 to crank 43. The velocity ratio between rotors 3 and 7 will depend on the angularity between them. Shaft 6 now may be flexible so as to transmit directly to the direct counting or registering mechanism of the meter. Obviously in the structures of Figs. 1 and 5 the means of varying the velocity ratios between the primary and secondary rotors consists of a means of varying the position of the contact on the surfaces of revolution of the rotors whereby revolution is imparted from the primary to the secondary rotor, and in Fig. 6 of a means of varying the direction or angularity of said contact, and in general to include all structures shown, this means consists of a means of so varying the contact on said surfaces of revolution whereby rotation is transmitted from the primary to the secondary rotors as to cause a change in their speed ratio.

For saturated vapors there exists one definite temperature for each pressure. Consequently there exists likewise, only one definite density of the dry saturated vapor for a given pressure or temperature. It follows that when applied to measure the weight flow of the dry saturated vapor then it is necessary to have only either of the mechanisms C or D separately in connection with the volume measuring mechanism and rotors A and B, or in other words, for such fluids the change of density for a given change of their pressure can be wholly responded to by the pressure mechanism D alone or by the temperature mechanism C alone. It follows further therefore that when applied to measure these fluids, either of the mechanisms C or D may be omitted and the meter will still have all of the essential parts necessary to have the registering proportional to the weight flow of the dry saturated vapors. It is to be understood, therefore, that merely omitting either of the mechanisms C or D and adjusting the remaining mechanisms to register weight flows of saturated vapors does not constitute a new invention.

Other changes in the mechanical details of construction and in the arrangement of parts could obviously be made without departing from the spirit and scope of my invention, and therefore I do not wish to limit my invention to the exact constructions shown.

Having thus described my invention, I claim as new and desire to secure by Letters Patent:

1. In elastic fluid meters having a means controlled by the fluid being metered which may be adapted to control a rotary motion, the combination of a primary rotor with a secondary rotor, said primary rotor having its rate of revolution controlled by said means adapted to control rotary motion, said rotors having surfaces of revolution, said secondary rotor receiving its motion by having the circumferential velocity of a circumference of the primary rotor transmitted, by mechanical contact, to a circumference of said secondary rotor, and a means of so varying the contacts on said surfaces of revolution, whereby rotation is transmitted from the primary to the secondary rotor, as to cause when actuated a change in the speed ratio between said rotors.

2. In elastic fluid meters having a means controlled by the fluid being metered, which means may be adapted to control a rotary motion, the combination of a primary rotor with a secondary rotor, said primary rotor having its rate of revolution controlled by said means adapted to control rotary motion, said rotors having surfaces of revolution, said secondary rotor receiving its motion by having the circumferential velocity of a circumference of the primary rotor transmitted, by mechanical contact, to a circumference of said secondary rotor, and a means of varying the position of the contact on the surfaces of revolution of the rotors whereby rotation is transmitted from the primary to the secondary rotor so as to cause a variation in their speed ratio.

3. In elastic fluid meters a mechanism responding automatically to temperature variations of the fluid being metered, said mechanism comprising a chamber (called hereafter "temperature cylinder") containing a fluid whose volume varies with its temperature, said temperature cylinder being comprised of a non-leaking envelop, a part of which is capable of undergoing relative reversible mechanical displacements which cause variations in the inclosed volume, whereby an increase of volume of the temperature fluid causes a relative displacement to said parts of the envelop capable of undergoing said reversible displacements, said displaceable parts of the envelop being mechanically connected to, or a part of, external mechanical parts which are likewise capable of undergoing reversible mechanical displacements and whereby the reversible displacements of the displaceable parts of the envelop are directly transmitted to said external displaceable parts when the inclosed volume is varied, said reversible displacements of the external parts (caused by an increase of the inclosed volume due to an increase of the temperature in the temperature cylinder) being mechanically guided and thereby forced to give conservative compression to a spring whereby the energy of compression is available to return the parts in the reversed direction over the path when the volume of the temperature fluid contracts due to cooling, and a means comprised of a conduit for transmitting the fluid being metered to a chamber surrounding the temperature cylinder whereby the temperature of the temperature fluid is maintained at the temperature of the fluid being metered.

4. In elastic fluid meters, a mechanism responding automatically to temperature variations of the fluid being metered, said mechanism comprising a temperature cylinder containing a fluid whose volume varies with its temperature, said temperature cylinder being comprised of a non-leaking envelop, a part of which is capable of undergoing relative reversible mechanical displacements which cause variations in the inclosed volume, whereby an increase of volume of the temperature fluid causes a relative displacement to said parts of the envelop capable of undergoing said reversible displacements, said displaceable parts of the envelop being mechanically connected to, or a part of, external mechanical parts which are likewise capable of undergoing reversible mechanical displacements and whereby the reversible displacements of the displaceable parts of the envelop are directly transmitted to said external displaceable parts when the inclosed volume is varied, said reversible displacements of the external parts (caused by an increase of the inclosed volume due to an increase of the temperature in the temperature cylinder) being mechanically guided and thereby forced to give conservative compression to a spring whereby the energy of compression is available to return the parts in the reversed direction over the path when the volume of the temperature fluid contracts due to cooling, and a means comprised of a conduit for transmitting the fluid being metered to a chamber surrounding the temperature cylinder whereby the temperature of the temperature fluid is maintained at the temperature of the fluid being metered, an independent manual means of adjusting the internal volume of and hence quantity of temperature fluid contained within said temperature cylinder, and an independent manual means of adjusting the tension in said compression springs.

5. In elastic fluid meters, a mechanism responding automatically to pressure variations of the fluid being metered, said mechanism comprising a chamber (called hereinafter the "pressure cylinder") to which fluid under pressure is admitted, said pressure cylinder being comprised of a non-leaking envelop, a part of which is capable of undergoing relative reversible mechanical displacements which cause variations in the inclosed volume whereby an increase of pressure of the fluid within the cylinder causes a relative displacement to said part of the envelop capable of undergoing said reversible displacements, said displaceable parts of the envelop being mechanically connected to, or a part of, external mechanical parts which are likewise capable of undergoing reversible mechanical displacements and whereby the reversible displacements of the displaceable parts of the envelop are directly transmitted to said external displaceable parts when the inclosed volume is varied because of an increase in the pressure of the fluid therein, said reversible displacements of the external parts (caused by an increase of the pressure of the fluid within the cylinder) being mechanically guided and thereby forced to give conservative compression to a spring, whereby the energy of compression is available to return the parts in the reversed direction over the path when the volume in the pressure cylinder is decreased as a result of a decrease of the pressure of the fluid contained therein, and a means comprised of a conduit of transmitting the fluid being metered to the pressure cylinder whereby the pressure of the fluid within the pressure cylinder is maintained at the pressure of the fluid being metered.

6. In elastic fluid meters, a mechanism responding automatically to pressure variations of the fluid being metered, said mechanism comprising a pressure cylinder to which fluid under pressure is admitted, said pressure cylinder being comprised of a non-leaking envelop, a part of which is capable of undergoing relative reversible mechanical displacements which cause variations in the inclosed volume whereby an increase of pressure of the fluid within the cylinder causes a relative displacement to said part of the envelop capable of undergoing said reversible displacements, said displaceable parts of the envelop being mechanically connected to, or a part of, external mechanical parts which are likewise capable of undergoing reversible mechanical displacements and whereby the reversible displacements of the displaceable parts of the envelop are directly transmitted to said external displaceable parts when the inclosed volume is varied because of an increase in the pressure of the fluid therein, said reversible displacements of the external parts (caused by an increase of the pressure of the fluid within the cylinder) being mechanically guided and thereby forced to give conservative compression to a spring, whereby the energy of compression is available to return the parts in the reversed direction over the path when the volume in the pressure cylinder is decreased as a result of a decrease of the pressure of the fluid contained therein, and a means comprised of a conduit of transmitting the fluid being metered to the pressure cylinder whereby the pressure of the fluid within the pressure cylinder is maintained at the pressure of the fluid being metered, and an independent manual means of adjusting the tension in said compression springs.

7. In elastic fluid meters having a means controlled by the fluid being metered which may be adapted to control a rotary motion, the combination with primary and secondary rotors of a mechanism responding automatically to variations of the temperature of the fluid being metered, said primary rotor having its rate of revolution controlled by said means adapted to control rotary motion, said rotors having surfaces of revolution, said secondary rotor receiving its motion by having the circumferential velocity of a circumference of the primary rotor transmitted, by mechanical contact, to a circumference of said secondary rotor, a means for varying the contact on said surfaces of revolution, whereby rotation is transmitted from the primary to the secondary rotor, so as to cause, when actuated, a change in the velocity ratio between said rotors, said mechanism responding automatically to temperature changes comprising a temperature cylinder containing a fluid whose volume varies with its temperature, said temperature cylinder being comprised of a non-leaking envelop, a part of which is capable of undergoing relative reversible mechanical displacements which cause variations in the inclosed volume, whereby an increase of volume of the temperature fluid causes a relative displacement to said parts of the envelop capable of undergoing said reversible displacements, said displaceable parts of the envelop being mechanically connected to, or a part of, external mechanical parts which are likewise capable of undergoing reversible mechanical displacements and whereby the reversible displacements of the displaceable parts of the envelop are directly transmitted to said external displaceable parts when the inclosed volume is varied, said reversible displacements of the external parts (caused by an increase of the inclosed volume due to an increase of the temperature in the temperature cylinder) being mechanically guided and thereby forced to give conservative compression to a spring whereby the energy of compression is available to return the parts in the reversed direction over the path when the volume of the temperature fluid contracts due to cooling, and a means comprised of a conduit for transmitting the fluid being metered to a chamber surrounding the temperature cylinder whereby the temperature of the temperature fluid is maintained at the temperature of the fluid being metered, a means connecting said parts reversibly mechanically displaced by temperature variations of fluid being metered to said means whereby the speed ratio between the rotors is varied, thereby automatically causing the speed ratio between said rotors to vary during said temperature variations.

8. In elastic fluid meters having a means controlled by the fluid being metered which may be adapted to control a rotary motion, the combination with primary and secondary rotors of a mechanism responding automatically to variations of the temperature of the fluid being metered, said primary rotor having its rate of revolution controlled by said means adapted to control rotary motion, said rotors having surfaces of revolution, said secondary rotor receiving its motion by having the circumferential velocity of a circumference of the primary rotor transmitted, by mechanical contact, to a circumference of said secondary rotor. a means for varying the contact on said surfaces of revolution, whereby rotation is transmitted from the primary to the secondary rotor, so as to cause, when actuated, a change in the velocity ratio between said rotors, said mechanism responding automatically to temperature changes comprising a temperature cylinder containing a fluid whose volume varies with its temperature, said temperature cylinder being comprised of a non-leaking envelop, a part of which is capable of undergoing relative reversible mechanical displacements which cause variations in the inclosed volume, whereby an increase of volume of the temperature fluid causes a relative displacement to said parts of the envelop capable of undergoing said reversible displacements, said displaceable parts of the envelop being mechanically connected to, or a part of, external mechanical parts which are likewise capable of undergoing reversible mechanical displacements and whereby the reversible displacements of the displaceable parts of the envelop are directly transmitted to said external displaceable parts when the inclosed volume is varied, said reversible displacements of the external parts (caused by an increase of the inclosed volume due to an increase of the temperature in the temperature cylinder) being mechanically guided and thereby forced to give conservative compression to a spring whereby the energy of compression is available to return the parts in the reversed direction over the path when the volume of the temperature fluid contracts due to cooling, and a means comprised of a conduit for transmitting the fluid being metered to a chamber surrounding the temperature cylinder whereby the temperature of the temperature fluid is maintained at the temperature of the fluid being metered, an independent manual means of adjusting the internal volume of and hence quantity of temperature fluid contained within said temperature cylinder, an independent manual means of adjusting the tension in said compression springs, a means connecting said parts reversibly mechanically displaced by temperature variations of fluid being metered to said means whereby the speed ratio between the rotors is varied, thereby automatically causing the speed ratio between said rotors to vary during said temperature variations.

9. In elastic fluid meters having a means controlled by the fluid being metered which may be adapted to control a rotary motion, the combination with primary and secondary rotors of a mechanism responding automatically to variations of the temperature of the fluid being metered, said primary rotor having its rate of revolution controlled by said means adapted to control rotary motion, said rotors having surfaces of revolution, said secondary rotor receiving its motion by having the circumferential velocity of a circumference of the primary rotor transmitted, by mechanical contact, to a circumference of said secondary rotor, a means for varying the contact on said surfaces of revolution, whereby rotation is transmitted from the primary to the secondary rotor, so as to cause, when actuated, a change in the velocity ratio between said rotors, said mechanism responding automatically to temperature changes comprising a temperature cylinder containing a fluid whose volume varies with its temperature, said temperature cylinder being comprised of a non-leaking envelop, a part of which is capable of undergoing relative reversible mechanical displacements which cause variations in the inclosed volume, whereby an increase of volume of the temperature fluid causes a relative displacement to said parts of the envelop capable of undergoing said reversible displacements, said displaceable parts of the envelop being mechanically connected to, or a part of, external mechanical parts which are likewise capable of undergoing reversible mechanical displacements and whereby the reversible displacements of the displaceable parts of the envelop are directly transmitted to said external displaceable parts when the inclosed volume is varied, said reversible displacements of the external parts (caused by an increase of the inclosed volume due to an increase of the temperature in the temperature cylinder) being mechanically guided and thereby forced to give conservative compression to a spring whereby the energy of compression is available to return the parts in the reversed direction over the path when the volume of the temperature fluid contracts due to cooling, and a means comprised of a conduit for transmitting the fluid being metered to a chamber surrounding the temperature cylinder whereby the temperature of the temperature fluid is maintained at the temperature of the fluid being metered, a means connecting said parts reversibly mechanically displaced by temperature variations of fluid being metered to said means whereby the speed ratio between the rotors is varied, thereby automatically causing the speed ratio between said rotors to vary during said temperature variations, the parts being so arranged as to cause the variations in speed ratio to be in the sense opposite to that of the temperature variation causing the speed ratio variation.

10. In elastic fluid meters having a means controlled by the fluid being metered which may be adapted to control a rotary motion, the combination with primary and secondary rotors of a mechanism responding automatically to variations of the pressure of the fluid being metered, said primary rotor having its rate of revolution controlled by said means adapted to control rotary motion, said rotors having surfaces of revolution, said secondary rotor receiving its motion by having the circumferential velocity of a circumference of the primary rotor transmitted, by mechanical contact, to a circumference of said secondary rotor, a means for varying the contact on said surfaces of revolution whereby rotation is imparted from the primary to the secondary rotor, so as to cause, when actuated, a change in the velocity ratio between said rotors, said mechanism responding automatically to pressure changes comprising a pressure cylinder to which fluid under pressure is admitted, said pressure cylinder being comprised of a non-leaking envelop, a part of which is capable of undergoing relative reversible mechanical displacements which cause variations in the inclosed volume whereby an increase of pressure of the fluid within the cylinder causes a relative displacement to said part of the envelop capable of undergoing said reversible displacements, said displaceable parts of the envelop being mechanically connected to, or a part of, external mechanical parts which are likewise capable of undergoing reversible mechanical displacements and whereby the reversible displacements of the displaceable parts of the envelop are directly transmitted to said external displaceable parts when the inclosed volume is varied because of an increase in the pressure of the fluid therein, said reversible displacements of the external parts (caused by an increase of the pressure of the fluid within the cylinder) being mechanically guided and thereby forced to give conservative compression to a spring, whereby the energy of compression is available to return the parts in the reversed direction over the path when the volume in the pressure cylinder is decreased as a result of a decrease of the pressure of the fluid contained therein, and a means comprised of a conduit of transmitting the fluid being metered to the pressure cylinder whereby the pressure of the fluid within the pressure cylinder is maintained at the pressure of the fluid being metered, a means connecting said parts reversibly mechanically displaced by pressure variations of the fluid to be metered to said means whereby the speed ratio between the rotors is varied, thereby automatically causing the speed ratio between said rotors to vary during said pressure variations.

11. In elastic fluid meters having a means controlled by the fluid being metered which may be adapted to control a rotary motion, the combination with primary and secondary rotors of a mechanism responding automatically to variations of the pressure of the fluid being metered, said primary rotor having its rate of revolution controlled by said means adapted to control rotary motion, said rotors having surfaces of revolution, said secondary rotor receiving its motion by having the circumferential velocity of a circumference of the primary rotor transmitted, by mechanical contact, to a circumference of said secondary rotor, a means for varying the contact on said surfaces of revolution whereby rotation is imparted from the primary to the secondary rotor, so as to cause, when actuated, a change in the velocity ratio between said rotors, said mechanism responding automatically to pressure changes comprising a pressure cylinder to which fluid under pressure is admitted, said pressure cylinder being comprised of a non-leaking envelop, a part of which is capable of undergoing relative reversible mechanical displacements which cause variations in the inclosed volume whereby an increase of pressure of the fluid within the cylinder causes a relative displacement to said part of the envelop capable of undergoing said reversible displacements, said displaceable parts of the envelop being mechanically connected to, or a part of, external mechanical parts which are likewise capable of undergoing reversible mechanical displacements and whereby the reversible displacements of the displaceable parts of the envelop are directly transmitted to said external displaceable parts when the inclosed volume is varied because of an increase in the pressure of the fluid therein, said reversible displacements of the external parts (caused by an increase of the pressure of the fluid within the cylinder) being mechanically guided and thereby forced to give conservative compression to a spring, whereby the energy of compression is available to return the parts in the reversed direction over the path when the volume in the pressure cylinder is decreased as a result of a decrease of the pressure of the fluid contained therein, and a means comprised of a conduit for transmitting the fluid being metered to the pressure cylinder whereby the pressure of the fluid within the pressure cylinder is maintained at the pressure of the fluid being metered, an independent manual means of adjusting the tension in said compression springs, a means connecting said parts reversibly mechanically displaced by pressure variations of the fluid to be metered to said means whereby the speed ratio between the rotors is varied, thereby automatically causing the speed ratio between said rotors to vary during said pressure variations.

12. In elastic fluid meters having a means controlled by the fluid being metered which may be adapted to control a rotary motion, the combination with primary and secondary rotors of a mechanism responding automatically to variations of the pressure of the fluid being metered, said primary rotor having its rate of revolution controlled by said means adapted to control rotary motion, said rotors having surfaces of revolution, said secondary rotor receiving its motion by having the circumferential velocity of a circumference of the primary rotor transmitted, by mechanical contact, to a circumference of said secondary rotor, a means for varying the contact on said surfaces of revolution whereby rotation is imparted from the primary to the secondary rotor, so as to cause, when actuated, a change in the velocity ratio between said rotors, said mechanism responding automatically to pressure changes comprising a pressure cylinder to which fluid under pressure is admitted, said pressure cylinder being comprised of a non-leaking envelop, a part of which is capable of undergoing relative reversible mechanical displacements which cause variations in the inclosed volume whereby an increase of pressure of the fluid within the cylinder causes a relative displacement to said part of the envelop capable of undergoing said reversible displacements, said displaceable parts of the envelop being mechanically connected to, or a part of, external mechanical parts which are likewise capable of undergoing reversible mechanical displacements and whereby the reversible displacements of the displaceable parts of the envelop are directly transmitted to said external displaceable parts when the inclosed volume is varied because of an increase in the pressure of the fluid therein, said reversible displacements of the external parts (caused by an increase of the pressure of the fluid within the cylinder) being mechanically guided and thereby forced to give conservative compression to a spring, whereby the energy of compression is available to return the parts in the reversed direction over the path when the volume in the pressure cylinder is decreased as a result of a decrease of the pressure of the fluid contained therein, and a means comprised of a conduit for transmitting the fluid being metered to the pressure cylinder whereby the pressure of the fluid within the pressure cylinder is maintained at the pressure of the fluid being metered, a means connecting said parts reversibly mechanically displaced by pressure variations of the fluid to be metered to said means whereby the speed ratio between the rotors is varied, thereby automatically causing the speed ratio between said rotors to vary during said pressure variations, the parts being so arranged as to cause the variations in speed ratio to be in the same sense as that of the pressure variation causing the speed ratio variation.

13. In elastic fluid meters, the combination with a mechanism responding automatically and independently to temperature variations of the fluid being metered of a mechanism responding automatically and independently to pressure variations of the fluid being metered, said mechanism responding to temperature variations comprising a temperature cylinder containing a fluid whose volume varies with its temperature, said temperature cylinder being comprised of a non-leaking envelop, a part of which is capable of undergoing relative reversible mechanical displacements which cause variations in the inclosed volume, whereby an increase of volume of the temperature fluid causes a relative displacement to said parts of the envelop capable of undergoing said reversible displacements, said displaceable parts of the envelop being mechanically connected to, or a part of, external mechanical parts which are likewise capable of undergoing reversible mechanical displacements and whereby the reversible displacements of the displaceable parts of the envelop are directly transmitted to said external displaceable parts when the inclosed volume is varied, said reversible displacements of the external parts (caused by an increase of the inclosed volume due to an increase of the temperature in the temperature cylinder) being mechanically guided and thereby forced to give conservative compression to a spring whereby the energy of compression is available to return the parts in the reversed direction over the path when the volume of the temperature fluid contracts due to cooling, and a means comprised of a conduit for transmitting the fluid being metered to a chamber surrounding the temperature cylinder whereby the temperature of the temperature fluid is maintained at the temperature of the fluid being metered, said mechanism responding automatically to pressure variations comprising a pressure cylinder to which fluid under pressure is admitted, said pressure cylinder being comprised of a non-leaking envelop, a part of which is capable of undergoing relative reversible mechanical displacements which cause variations in the inclosed volume whereby an increase of pressure of the fluid within the cylinder causes a relative displacement to said part of the envelop capable of undergoing said reversible displacements, said displaceable parts of the envelop being mechanically connected to, or a part of, external mechanical parts which are likewise capable of undergoing reversible mechanical displacements and whereby the reversible displacements of the displaceable parts of the envelop are directly transmitted to said external displaceable parts when the inclosed volume is varied because of an increase in the pressure of the fluid therein, said reversible displacements of the external parts (caused by an increase of the pressure of the fluid within the cylinder) being mechanically guided and thereby forced to give conservative compression to a spring, whereby the energy of compression is available to return the parts in the reversed direction over the path when the volume in the pressure cylinder is decreased as a result of a decrease of the pressure of the fluid contained therein, and a means comprised of a conduit for transmitting the fluid being metered to the pressure cylinder, whereby the pressure of the fluid within the pressure cylinder is maintained at the pressure of the fluid being metered, said external parts of the temperature mechanism capable of undergoing reversible displacements being mechanically linked to the same member as that at whose opposite end the said external reversibly displaceable parts of the pressure mechanism are linked, whereby the reversible displacements due to variations of pressure and temperature are transmitted to a common member, and the parts are so arranged as to have the pressure and temperature mechanisms function entirely independently of each other.

14. In elastic fluid meters, the combination with a mechanism responding automatically and independently to temperature variations of the fluid being metered of a mechanism responding automatically and independently to pressure variations of the fluid being metered, said mechanism responding to temperature variations comprising a temperature cylinder containing a fluid whose volume varies with its temperature, said temperature cylinder being comprised of a non-leaking envelop, a part of which is capable of undergoing relative reversible mechanical displacements which cause variations in the inclosed volume, whereby an increase of volume of the temperature fluid causes a relative displacement to said parts of the envelop capable of undergoing said reversible displacements, said displaceable parts of the envelop being mechanically connected to, or a part of, external mechanical parts which are likewise capable of undergoing reversible mechanical displacements and whereby the reversible displacements of the displaceable parts of the envelop are directly transmitted to said external displaceable parts when the inclosed volume is varied, said reversible displacements of the external parts (caused by an increase of the inclosed volume due to an increase of the temperature in the temperature cylinder) being mechanically guided and thereby forced to give conservative compression to a spring whereby the energy of compression is available to return the parts in the reversed direction over the path when the volume of the temperature fluid contracts due to cooling, and a means comprised of a conduit for transmitting the fluid being metered to a chamber surrounding the temperature cylinder whereby the temperature of the temperature fluid is maintained at the temperature of the fluid being metered, an independent manual means of adjusting the internal volume of and hence quantity of temperature fluid contained within said temperature cylinder, an independent manual means of adjusting the tension in said compression springs, said mechanism responding automatically to pressure variations comprising a pressure cylinder to which fluid under pressure is admitted, said pressure cylinder being comprised of a non-leaking envelop, a part of which is capable of undergoing relative reversible mechanical displacements which cause variations in the inclosed volume whereby an increase of pressure of the fluid within the cylinder causes a relative displacement to said part of the envelop capable of undergoing said reversible displacements, said displaceable parts of the envelop being mechanically connected to, or a part of, external mechanical parts which are likewise capable of undergoing reversible mechanical displacements and whereby the reversible displacements of the displaceable parts of the envelop are directly transmitted to said external displaceable parts when the inclosed volume is varied because of an increase in the pressure of the fluid therein, said reversible displacements of the external parts (caused by an increase of the pressure of the fluid within the cylinder) being mechanically guided and thereby forced to give conservative compression to a spring, whereby the energy of compression is available to return the parts in the reversed direction over the path when the volume in the pressure cylinder is decreased as a result of a decrease of the pressure of the fluid contained therein, and a means comprised of a conduit for transmitting the fluid being metered to the pressure cylinder whereby the pressure of the fluid within the pressure cylinder is maintained at the pressure of the fluid being metered, an independent manual means of adjusting the tension of said elastic and conservative controlling mediums, said external parts of the temperature mechanism capable of undergoing reversible displacements being mechanically linked to the same member as that at whose opposite end the said external reversibly displaceable parts of the pressure mechanism are linked, whereby the reversible displacements due to variations of pressure and temperature are transmitted to a common member, and the parts are so arranged as to have the pressure and temperature mechanisms function entirely independently of each other.

15. In elastic fluid meters, the combination with a mechanism responding automatically and independently to temperature variations of the fluid being metered of a mechanism responding automatically and independently to pressure variations of the fluid being metered, said mechanism responding to temperature variations comprising a temperature cylinder containing a fluid whose volume varies with its temperature, said temperature cylinder being comprised of a non-leaking envelop, a part of which is capable of undergoing relative reversible mechanical displacements which cause variations in the inclosed volume, whereby an increase of volume of the temperature fluid causes a relative displacement to said parts of the envelop capable of undergoing said reversible displacements, said displaceable parts of the envelop being mechanically connected to, or a part of, external mechanical parts which are likewise capable of undergoing reversible mechanical displacements and whereby the reversible displacements of the displaceable parts of the envelop are directly transmitted to said external displaceable parts when the inclosed volume is varied, said reversible displacements of the external parts (caused by an increase of the inclosed volume due to an increase of the temperature in the temperature cylinder) being mechanically guided and thereby forced to give conservative compression to a spring whereby the energy of compression is available to return the parts in the reversed direction over the path, when the volume of the temperature fluid contracts due to cooling, and a means comprised of a conduit for transmitting the fluid being metered to a chamber surrounding the temperature cylinder whereby the temperature of the temperature fluid is maintained at the temperature of the fluid being metered, said mechanism responding automatically to pressure variations comprising a pressure cylinder to which fluid under pressure is admitted, said pressure cylinder being comprised of a non-leaking envelop, a part of which is capable of undergoing relative reversible mechanical displacements which cause variations in the inclosed volume whereby an increase of pressure of the fluid within the cylinder causes a relative displacement to said part of the envelop capable of undergoing said reversible displacements, said displaceable parts of the envelop being mechanically connected to, or a part of, external mechanical parts which are likewise capable of undergoing reversible mechanical displacements and whereby the reversible displacements of the displaceable parts of the envelop are directly transmitted to said external displaceable parts when the inclosed volume is varied because of an increase in the pressure of the fluid therein, said reversible displacements of the external parts (caused by an increase of the pressure of the fluid within the cylinder) being mechanically guided and thereby forced to give conservative compression to a spring, whereby the energy of compression is available to return the parts in the reversed direction over the path when the volume in the pressure cylinder is decreased as a result of a decrease of the pressure of the fluid contained therein, and a means comprised of a conduit of transmitting the fluid being metered to the pressure cylinder whereby the pressure of the fluid within the pressure cylinder is maintained at the pressure of the fluid being metered, said external parts of the temperature mechanism capable of undergoing reversible displacements being mechanically linked to the same member as that at whose opposite end the said external reversibly displaceable parts of the pressure mechanism are linked, whereby the reversible displacements due to variations of pressure and temperature are transmitted to a common member, and the parts are so arranged as to have the pressure and temperature mechanisms function entirely independently of each other, said parts being further so arranged as to have the displacements due to temperature variations relatively opposite to those due to pressure variations.

16. In elastic fluid meters having a means controlled by the fluid being metered, which means may be adapted to control a rotary motion, the combination with primary and secondary rotors of mechanisms responding automatically and independently to variations of the pressure and temperature of the fluid being metered, said primary rotor having its rate of revolution controlled by said means adapted to control rotary motion, said rotors having surfaces of revolution, said secondary rotor receiving its motion by having the circumferential velocity of a circumference of the primary rotor transmitted, by mechanical contact, to a circumference of said secondary rotor. a means of so varying the contacts on said surfaces of revolution, whereby rotation is transmitted from the primary to the secondary rotor, as to cause when actuated a change in the speed ratio between said rotors, said mechanisms responding to temperature variations comprising a temperature cylinder containing a fluid whose volume varies with its temperature, said temperature cylinder being comprised of a non-leaking envelop, a part of which is capable of undergoing relative reversible mechanical displacements which cause variations in the inclosed volume, whereby an increase of volume of the temperature fluid causes a relative displacement to said parts of the envelop capable of undergoing said reversible displacements, said displaceable parts of the envelop being mechanically connected to, or a part of, external mechanical parts which are likewise capable of undergoing reversible mechanical displacements and whereby the reversible displacements of the displaceable parts of the envelop are directly transmitted to said external displaceable parts when the inclosed volume is varied, said reversible displacements of the external parts (caused by an increase of the inclosed volume due to an increase of the temperature in the temperature cylinder) being mechanically guided and thereby forced to give conservative compression to a spring whereby the energy of compression is available to return the parts in the reversed direction over the path when the volume of the temperature fluid contracts due to cooling, and a means comprised of a conduit for transmitting the fluid being metered to a chamber surrounding the temperature cylinder whereby the temperature of the temperature fluid is maintained at the temperature of the fluid being metered, said mechanism responding automatically to pressure variations comprising a pressure cylinder to which fluid under pressure is admitted, said pressure cylinder being comprised of a non-leaking envelop, a part of which is capable of undergoing relative reversible mechanical displacements which cause variations in the inclosed volume whereby an increase of pressure of the fluid within the cylinder causes a relative displacement to said part of the envelop capable of undergoing said reversible displacements, said displaceable parts of the envelop being mechanically connected to, or a part of, external mechanical parts which are likewise capable of undergoing reversible mechanical displacements and whereby the reversible displacements of the displaceable parts of the envelop are directly transmitted to said external displaceable parts when the inclosed volume is varied because of an increase in the pressure of the fluid therein, said reversible displacements of the external parts (caused by an increase of the pressure of the fluid within the cylinder) being mechanically guided and thereby forced to give conservative compression to a spring, whereby the energy of compression is available to return the parts in the reversed direction over the path when the volume in the pressure cylinder is decreased as a result of a decrease of the pressure of the fluid contained therein, and a means comprised of a conduit of transmitting the fluid being metered to the pressure cylinder whereby the pressure of the fluid within the pressure cylinder is maintained at the pressure of the fluid being metered, said external parts of the temperature mechanism capable of undergoing reversible displacements being mechanically linked to the same member as that at whose opposite end the said external reversibly displaceable parts of the pressure mechanism are linked, whereby the reversible displacements of pressure and temperature are transmitted to a common member, and the parts are so arranged as to have the pressure and temperature mechanisms function entirely independently of each other, and a means connecting said common member to said means whereby the speed ratio between the rotors is varied and thereby automatically causing the speed ratio between said rotors to vary during said temperature and pressure variations.

17. In elastic fluid meters having a means controlled by the fluid being metered which may be adapted to control a rotary motion, the combination with primary and secondary rotors of mechanisms responding automatically to variations of the pressure and temperature of the fluid being metered, said primary rotor having its rate of revolution controlled by said means adapted to control rotary motion, said rotors having surfaces of revolution, said secondary rotor receiving its motion by having the circumferential velocity of a circumference of the primary rotor transmitted, by mechanical contact, to a circumference of said secondary rotor, a means for varying the contact on said surfaces of revolution whereby rotation is imparted from the primary to the secondary rotor, so as to cause, when actuated, a change in the velocity ratio between said rotors, said mechanism responding automatically to pressure changes comprising a pressure cylinder to which fluid under pressure is admitted, said pressure cylinder being comprised of a non-leaking envelop, a part of which is capable of undergoing relative reversible mechanical displacements which cause variations in the inclosed volume whereby an increase of pressure of the fluid within the cylinder causes a relative displacement to said part of the envelop capable of undergoing said reversible displacements, said displaceable parts of the envelop being mechanically connected to, or a part of, external mechanical parts which are likewise capable of undergoing reversible mechanical displacements and whereby the reversible displacements of the displaceable parts of the envelop are directly transmitted to said external displaceable parts when the inclosed volume is varied because of an increase in the pressure of the fluid therein, said reversible displacements of the external parts (caused by an increase of the pressure of the fluid within the cylinder) being mechanically guided and thereby forced to give conservative compression to a spring, whereby the energy of compression is available to return the parts in the reversed direction over the path when the volume in the pressure cylinder is decreased as a result of a decrease of the pressure of the fluid contained therein, and a means comprised of a conduit of transmitting the fluid being metered to the pressure cylinder whereby the pressure of the fluid within the pressure cylinder is maintained at the pressure of the fluid being metered, an independent manual means of adjusting the tension in said compression springs, said mechanism responding to temperature variations comprising a temperature cylinder containing a fluid whose volume varies with its temperature, said temperature cylinder being comprised of a non-leaking envelop, a part of which is capable of undergoing relative reversible mechanical displacements which cause variations in the inclosed volume, whereby an increase of volume of the temperature fluid causes a relative displacement to said parts of the envelop capable of undergoing said reversible displacements, said displaceable parts of the envelop being mechanically connected to, or a part of, external mechanical parts which are likewise capable of undergoing reversible mechanical displacements and whereby the reversible displacements of the displaceable parts of the envelop are directly transmitted to said external displaceable parts when the inclosed volume is varied, said reversible displacements of the external parts (caused by an increase of the inclosed volume due to an increase of the temperature in the temperature cylinder) being mechanically guided and thereby forced to give conservative compression to a spring whereby the energy of compression is available to return the parts in the reversed direction over the path when the volume of the temperature fluid contracts due to cooling, and a means comprised of a conduit for transmitting the fluid being metered to a chamber surrounding the temperature cylinder whereby the temperature of the temperature fluid is maintained at the temperature of the fluid being metered, an independent manual means of adjusting the internal volume of and hence quantity of temperature fluid contained within said temperature cylinder, an independent manual means of adjusting the tension in said elastic and conservative controlling medium, said external parts of the temperature mechanism capable of undergoing reversible displacements being mechanically linked to the same member as that at whose opposite end the said external reversibly displaceable parts of the pressure mechanism are linked, whereby the reversible displacements due to variations of pressure and temperature are transmitted to a common member, and the parts are so arranged as to have the pressure and temperature mechanisms function entirely independently of each other, said parts being further so arranged as to have the displacements due to temperature variations relatively opposite to those due to pressure variations, and a means connecting said common member to said means whereby the speed ratio between the rotors is varied and thereby automatically causing the speed ratio between said rotors to vary during said temperature and pressure variations.

18. In elastic fluid meters having a means controlled by the fluid being metered which may be adapted to control a rotary motion, the combination with primary and secondary rotors of mechanisms responding automatically to variations of the pressure and temperature of the fluid being metered, said primary rotor having its rate of revolution controlled by said means adapted to control rotary motion, said rotors having surfaces of revolution, said secondary rotor receiving its motion by having the circumferential velocity of a circumference of the primary rotor transmitted, by mechanical contact, to a circumference of said secondary rotor, a means for varying the contact on said surfaces of revolution whereby rotation is imparted from the primary to the secondary rotor, so as to cause, when actuated, a change in the velocity ratio between said rotors, said mechanism responding automatically to pressure changes comprising a pressure cylinder to which fluid under pressure is admitted, said pressure cylinder having a means whereby its internal volume is caused to be varied by said variations of pressure, a means whereby said variations of internal volume are transmitted to external parts so arranged as to undergo thereby reversible mechanical displacements, said displacements being controlled by an elastic and conservative medium, a means for having said fluid within said pressure chamber at the pressure of the fluid to be metered, an independent manual means of adjusting the tension in said compression springs, said mechanism responding to temperature variations comprising a temperature cylinder containing a fluid whose volume varies with its temperature, said temperature cylinder having a means whereby its internal volume is caused to be varied by said variations of temperature, a means whereby said variations of said internal volume are transmitted to external parts so arranged as to undergo thereby reversible mechanical displacements, said displacements being controlled by an elastic and conservative medium, a means of having said fluid within the temperature cylinder at that temperature of the fluid being metered, an independent manual means of adjusting the internal volume of and hence quantity of temperature fluid contained within said temperature cylinder, an independent manual means of adjusting the tension in said elastic and conservative controlling medium, said external parts of the temperature mechanism capable of undergoing reversible displacements being mechanically linked to the same member as that at whose opposite end the said external reversibly displaceable parts of the pressure mechanism are linked, whereby the reversible displacements due to variations of pressure and temperature are transmitted to a common member, and the parts are so arranged as to have the pressure and temperature mechanisms function entirely independently of each other, said parts being further so arranged as to have the displacements due to temperature variations relatively opposite to those due to pressure variations, a means connecting said common member to said means whereby the speed ratio betwen the rotors is varied and thereby automatically causing the speed ratio between said rotors to vary during said temperature and pressure variations, the parts being so arranged as to be so adjustable that the variations in the speed ratio between the rotors, caused by said variations of pressure and temperature, are proportional to the variations of density of the fluid being metered due to said changes of pressure and temperature of said fluid.

19. In elastic fluid meters, the combination with a mechanism responding automatically to temperature changes of the fluid being metered of a movable record tape, said temperature mechanism having a temperature cylinder, said temperature cylinder being comprised of a non-leaking envelop, a part of which is capable of undergoing relative reversible mechanical displacements which cause variations in the inclosed volume, whereby an increase of volume of the temperature fluid causes a relative displacement to said parts of the envelop capable of undergoing said reversible displacements, said displaceable parts of the envelop being mechanically connected to, or a part of, external mechanical parts which are likewise capable of undergoing reversible mechanical displacements and whereby the reversible displacements of the displaceable parts of the envelop are directly transmitted to said external displaceable parts when the inclosed volume is varied, said reversible displacements of the external parts (caused by an increase of the inclosed volume due to an increase of the temperature in the temperature cylinder) being mechanically guided and thereby forced to give conservative compression to a spring whereby the energy of compression is available to return the parts in the reversed direction over the path when the volume of the temperature fluid contracts due to cooling, and a means comprised of a conduit for transmitting the fluid being metered to a chamber surrounding the temperature cylinder whereby the temperature of the temperature fluid is maintained at the temperature of the fluid being metered, said record tape being caused to move longitudinally at right angles to the parts of said mechanism being reversibly mechanically displaced, said mechanism being displaced having a marking means bearing on said tape whereby lateral displacements of the marking means with respect to said tape represent variations of temperature of the fluid being metered.

20. In elastic fluid meters, the combination with a mechanism responding automatically to pressure changes of the fluid being metered, of a movable record tape, said pressure mechanism having a pressure cylinder, said pressure cylinder being comprised of a non-leaking envelop, a part of which is capable of undergoing relative reversible mechanical displacements which cause variations in the inclosed volume whereby an increase of pressure of the fluid within the cylinder causes a relative displacement to said part of the envelop capable of undergoing said reversible displacements, said displaceable parts of the envelop being mechanically connected to, or a part of, external mechanical parts which are likewise capable of undergoing reversible mechanical displacements and whereby the reversible displacements of the displaceable parts of the envelop are directly transmitted to said external displaceable parts when the inclosed volume is varied because of an increase in the pressure of the fluid therein, said reversible displacements of the external parts (caused by an increase of the pressure of the fluid within the cylinder) being mechanically guided and thereby forced to give conservative compression to a spring, whereby the energy of compression is available to return the parts in the reversed direction over the path when the volume in the pressure cylinder is decreased as a result of a decrease of the pressure of the fluid contained therein, and a means comprised of a conduit of transmitting the fluid being metered to the pressure cylinder whereby the pressure of the fluid within the pressure cylinder is maintained at the pressure of the fluid being metered, said record tape being caused to move longitudinally at right angles to the parts of said mechanism being reversibly mechanically displaced, said mechanism being displaced having a marking means bearing on said tape whereby lateral displacements of the marking means with respect to said tape represent variations of pressure of the fluid being metered.

21. In elastic fluid meters, the combination with mechanisms responding automatically to variations of the pressure and temperature of the fluid being metered of a movable record tape, said mechanism responding to temperature variations comprising a temperature cylinder containing a fluid whose volume varies with its temperature, said temperature cylinder being comprised of a non-leaking envelop, a part of which is capable of undergoing relative reversible mechanical displacements which cause variations in the inclosed volume, whereby an increase of volume of the temperature fluid causes a relative displacement to said parts of the envelop capable of undergoing said reversible displacements, said displaceable parts of the envelop being mechanically connected to, or a part of, external mechanical parts which are likewise capable of undergoing reversible mechanical displacements and whereby the reversible displacements of the displaceable parts of the envelop are directly transmitted to said external displaceable parts when the inclosed volume is varied, said reversible displacements of the external parts (caused by an increase of the inclosed volume due to an increase of the temperature in the temperature cylinder) being mechanically guided and thereby forced to give conservative compression to a spring whereby the energy of compression is available to return the parts in the reversed direction over the path when the volume of the temperature fluid contracts due to cooling, and a means comprised of a conduit for transmitting the fluid being metered to a chamber surrounding the temperature cylinder whereby the temperature of the temperature fluid is maintained at the temperature of the fluid being metered, said mechanism responding automatically to pressure variations comprising a pressure cylinder to which fluid under pressure is admitted, said pressure cylinder being comprised of a non-leaking envelop, a part of which is capable of undergoing relative reversible mechanical displacements which cause variations in the inclosed volume whereby an increase of pressure of the fluid within the cylinder causes a relative displacement to said part of the envelop capable of undergoing said reversible displacements, said displaceable parts of the envelop being mechanically connected to, or a part of, external mechanical parts which are likewise capable of undergoing reversible mechanical displacements and whereby the reversible displacements of the displaceable parts of the envelop are directly transmitted to said external displaceable parts when the inclosed volume is varied because of an increase in the pressure of the fluid therein, said reversible displacements of the external parts (caused by an increase of the pressure of the fluid within the cylinder) being mechanically guided and thereby forced to give conservative compression to a spring, whereby the energy of compression is available to return the parts in the reverse direction over the path when the volume in the pressure cylinder is decreased as a result of a decrease of the pressure of the fluid contained therein, and a means comprised of a conduit of transmitting the fluid being metered to the pressure cylinder whereby the pressure of the fluid within the pressure cylinder is maintained at the pressure of the fluid being metered, said external parts of the temperature mechanism capable of undergoing reversible displacements being mechanically linked to the same member as that at whose opposite end the said external reversibly displaceable parts of the pressure mechanism are linked, whereby the reversible displacements due to variations of pressure and temperature are transmitted to a common member, and the parts are so arranged as to have the pressure and temperature mechanisms function entirely independently of each other, said record tape being caused to move longitudinally at right angles to the parts of said mechanisms being reversibly mechanically displaced, said mechanism being displaced having a marking means bearing on said tape whereby lateral displacements of the marking means with respect to said tape represent variations of temperature, pressure, or density, depending on what mechanisms the marking means is fixed to.

In testimony whereof, I have signed my name to this specification in the presence of two subscribing witnesses.

WALTER JACOB WOHLENBERG.

Witnesses:
P. J. WOHLENBERG,
J. F. HOLLAHAM.